US008457561B2

(12) United States Patent
Grunert et al.

(10) Patent No.: US 8,457,561 B2
(45) Date of Patent: Jun. 4, 2013

(54) METHOD AND SYSTEM FOR SIGNAL STRENGTH MEASUREMENT

(75) Inventors: Norbert Grunert, Juan-les-Pins (FR); Brima Ibrahim, Aliso Viejo, CA (US); Siukai Mak, San Diego, CA (US); Hea Joung Kim, Irvine, CA (US); Amir Ibrahim, Newport Beach, CA (US); Thomas Baker, Dana Point, CA (US)

(73) Assignee: Broadcom Corporation, Irvine, CA (US)

( * ) Notice: Subject to any disclaimer, the term of this patent is extended or adjusted under 35 U.S.C. 154(b) by 422 days.

(21) Appl. No.: 12/878,771

(22) Filed: Sep. 9, 2010

(65) Prior Publication Data

US 2012/0003942 A1 Jan. 5, 2012

Related U.S. Application Data

(60) Provisional application No. 61/360,785, filed on Jul. 1, 2010.

(51) Int. Cl.
 *H04B 1/00* (2006.01)
(52) U.S. Cl.
 USPC ............... 455/63.1; 455/114.2; 455/278.1; 455/296; 370/318
(58) Field of Classification Search
 USPC ............... 455/63.1, 114.2, 278.1, 296, 522, 455/67.13, 226.2, 115.3, 161.3; 370/318
 See application file for complete search history.

(56) References Cited

U.S. PATENT DOCUMENTS

| | | | | |
|---|---|---|---|---|
| 6,167,310 A * | 12/2000 | Grevious | ......................... | 607/32 |
| 6,580,391 B1 * | 6/2003 | Kepley et al. | ................. | 342/359 |
| 6,650,876 B1 * | 11/2003 | Ostman et al. | ................ | 455/103 |
| 7,555,261 B2 * | 6/2009 | O'Neill | ......................... | 455/11.1 |
| 7,675,892 B2 * | 3/2010 | Min | .............................. | 370/338 |
| 7,738,888 B2 * | 6/2010 | Jeong | ............................ | 455/500 |
| 8,175,521 B2 * | 5/2012 | O'Neill | ............................ | 455/7 |
| 2008/0058026 A1 * | 3/2008 | Jeong | ............................. | 455/572 |
| 2009/0005105 A1 * | 1/2009 | Hwang et al. | ................. | 455/522 |
| 2010/0004016 A1 * | 1/2010 | Yin et al. | ...................... | 455/522 |
| 2011/0275361 A1 * | 11/2011 | Yavuz et al. | ............... | 455/422.1 |
| 2012/0094624 A1 * | 4/2012 | Soulhi et al. | .............. | 455/226.2 |
| 2012/0135777 A1 * | 5/2012 | Karpoor et al. | ............... | 455/522 |
| 2012/0202419 A1 * | 8/2012 | O'Neill | ........................... | 455/15 |

* cited by examiner

*Primary Examiner* — Minh D Dao
(74) *Attorney, Agent, or Firm* — Brinks Hofer Gilson & Lione

(57) ABSTRACT

In a radio comprising a transmitter and a receiver, transmission and reception of signals may be controlled based on received signal strength measurements from a signal strength indicator module and transmitted signal strength measurements from the signal strength indicator module. For the transmitted signal strength measurements, the shared signal strength indicator module may measure signal strength of a signal output by a power amplifier. For the received signal strength measurements, the shared signal strength indicator module may measure signal strength of a received signal. A capacitance coupled to an output of the power amplifier may be configured based on a frequency of the signal output by the power amplifier. A gain of the power amplifier may be controlled based on the transmitted signal strength measurements. For the transmitted signal strength measurements, an analog-to-digital converter may process the signal output by the power amplifier.

25 Claims, 8 Drawing Sheets

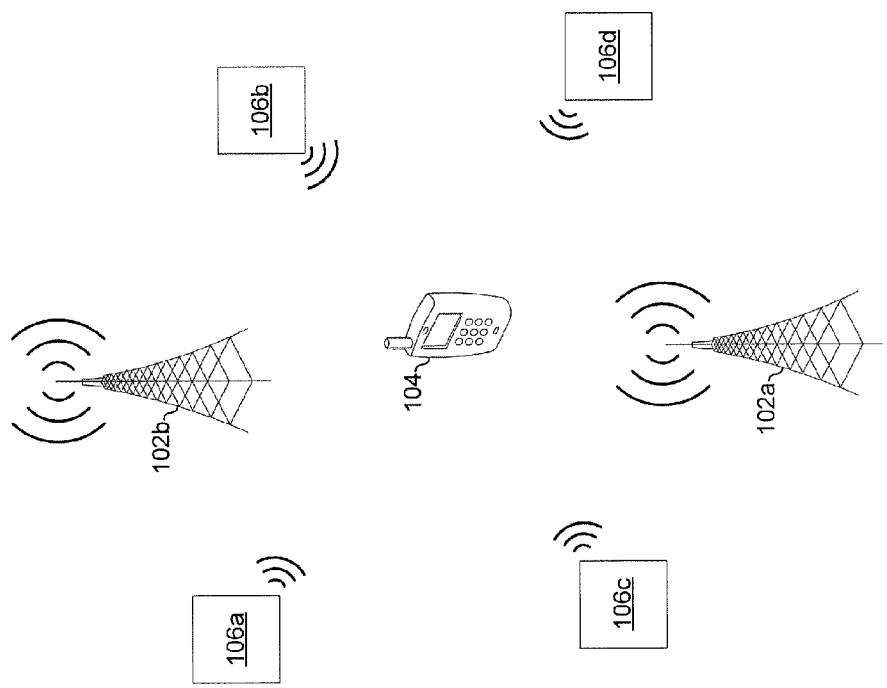

METHOD AND SYSTEM FOR SIGNAL STRENGTH MEASUREMENT

CROSS-REFERENCE TO RELATED APPLICATIONS/INCORPORATION BY REFERENCE

This patent application makes reference to, claims priority to and claims benefit from U.S. Provisional Patent Application Ser. No. 61/360,785 filed on Jul. 1, 2010.

The above stated application is hereby incorporated herein by reference in its entirety.

FIELD OF THE INVENTION

Certain embodiments of the invention relate to communications. More specifically, certain embodiments of the invention relate to a method and system for signal strength measurement.

BACKGROUND OF THE INVENTION

Due to process, voltage, and temperature variations, the precise performance of modern electronics is often difficult to accurately predict before the device is actually built and tested. As a result, electronic devices often require calibration, which is performed prior to shipment of the product to customers. Such calibration adds cost to the product, particularly in instances where the calibration requires manual input. Moreover, even once a device is calibrated in the factory, usually such a calibration would not be optimal for all operating conditions. Some electronic devices often have built in auto-test and calibration functions that enable the devices to automatically calibrate themselves. However, building in such functions adds components and complexity to the device, which ultimately drives up cost.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for signal strength measurement, substantially as illustrated by and/or described in connection with at least one of the figures, as set forth more completely in the claims.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 1A is a diagram illustrating an exemplary communication device operating in an environment comprising RF signals from a multitude of sources, in accordance with an embodiment of the invention.

DETAILED DESCRIPTION OF THE INVENTION

Figure 1B:
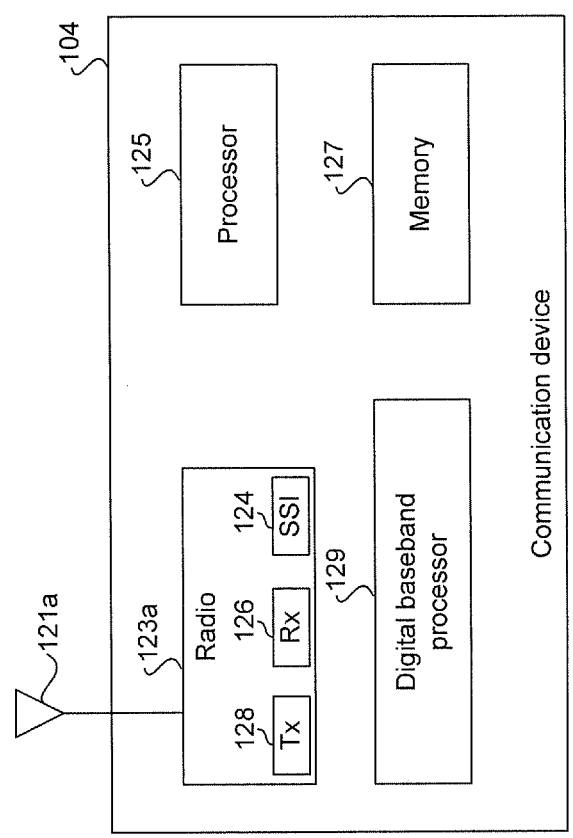
FIG. 1B is a block diagram illustrating an exemplary RF communication device, in accordance with an embodiment of the invention.

Certain embodiments of the invention may be found in a method and system for signal strength measurement. In various embodiments of the invention, in a radio comprising a transmitter and a receiver, transmission and reception of signals may be controlled based on received signal strength measurements from a signal strength indicator module and transmitted signal strength measurements from the signal strength indicator module. For the transmitted signal strength measurements, the shared signal strength indicator module may measure signal strength of a signal output by a power amplifier. For the received signal strength measurements, the shared signal strength indicator module may measure signal strength of a received signal. A capacitance coupled to an output of the power amplifier may be configured based on a frequency of the signal output by the power amplifier. A gain of the power amplifier may be controlled based on the transmitted signal strength measurements. For the transmitted signal strength measurements, an analog-to-digital converter may process the signal output by the power amplifier. For the received signal strength measurements, the analog-to-digital converter may process the received signal. An output of the analog-to-digital converter may be an input to the signal strength indicator module. The radio comprising the transmitter and the receiver may be integrated on a single substrate of an integrated circuit or chip.

In one aspect of the invention, a plurality of samples may be generated by sampling a received signal over a range of frequencies, the signal strength indicator may measure signal strength of each of the samples, and a noise floor may be calculated based on particular samples. The noise floor may be calculated based on a weighted averaging of the particular samples. A signal-to-noise ratio of one or more channels in the range of frequencies may be calculated by subtracting the calculated noise floor from one or more signal strength measurements corresponding to one or more samples lying within the one or more channels. Channels within the range of frequencies may be classified based on the calculated signal-to-noise ratio. The one or more channels may be FM broadcast radio channels, and each of the FM broadcast radio channels may be classified into one of the following categories: channels that are too noisy for suitable reception, channels that are suitable for monaural reception, channels that are suitable for stereo reception, and channels that are suitable for radio data system (RDS) reception.

FIG. 1A is a diagram illustrating an exemplary communication device operating in an environment comprising RF signals from a multitude of sources, in accordance with an embodiment of the invention. Referring to FIG. 1 there is shown communication device 104, nodes 102a-102b, and RF sources 106a-106d.

The nodes 102a and 102b may each comprise source of signals that the communication device 104 may be operable to receive and process. In an exemplary embodiment of the invention, the nodes 102a and 102b may each comprise an FM radio broadcast tower. That is, each of the nodes 102a and 102b may transmit one or more radio stations, each of which may comprise a monaural audio, stereo audio, and/or radio data system (RDS) content. In such an embodiment of the invention, the communication device 104 may comprise an FM broadcast radio receiver and may be operable to tune to a desired radio station transmitted by one of the nodes 102a-102b. The invention, however, is not limited to FM broadcast radio applications. In various embodiments of the invention, the nodes 102a-102d may be cellular base stations, wireless local area network (WLAN) access points, television broadcast towers, satellites, or any other type of transmitter. Non-idealities in the nodes 102 and 102b may also cause the nodes 102a and 102b to transmit undesired signals such as noise.

The communication device 104 may comprise suitable logic, circuitry, interfaces, and/or code that may be operable to transmit and/or receive wireless signals in accordance with one or more wireless protocols such as FM broadcast radio protocols, cellular protocols, WLAN protocols, and broadcast television protocols. The communication device 104 may be operable to receive desired wireless signals in the presence undesired signals, i.e. noise. As part of mitigating the effects of such interference, the communication device 104 may be operable to determine a noise floor of a wireless environment in which the communication device 104 is operating. The determined noise floor may then be utilized to determine SNR of received signals. The communication device 104 may comprise a wideband received signal strength indicator (WRSSI) which may be utilized for determining the noise floor. The WRSSI may also be utilized to calibrate a transmit chain of the communication device 104, as described below with respect to FIG. 4.

The RF sources 106a-106d may each comprise a source or RF signals or energy that the communication device 104 may be unable to receive and process. In this regard, one or more of the RF sources 106a-106d may comprise a transmitter that transmits signals utilizing wireless protocols unsupported by the communication device 104, or one or more of the RF sources 106a-106d may comprise an electronic device that does not intentionally emits wireless signals but nonetheless emits electromagnetic interference(EMI).

In operation, the communication device 104 may, for example, determine whether a signal of sufficient quality may be received on one or more channels. The communication device 104 may make such a determination based on the SNR of the one or more channels. Accordingly, to determine the SNR, the communication device 104 may first determine a noise floor of a frequency band in which the one or more channels lie. In determining the noise floor, the communication device 104 may be operable to separate desired signals transmitted by the nodes 102a and 102b from undesired signals transmitted by the RF sources 106a-106d and the nodes 102a and 102b. The noise floor may be determined utilizing a WRSSI.

Also, in instances that the communication device 104 transmits to one or more of the nodes 102a and 102b, one or more components of a transmit chain within the communication device 104 may be calibrated utilizing the WRSSI, as described below with respect to FIG. 4.

FIG. 1B is a block diagram illustrating an exemplary RF communication device, in accordance with an embodiment of the invention. Referring to FIG. 1B, the RF communication device 104 may comprise a radio 123a, a digital baseband processor 129, a processor 125, and a memory 127. An antenna 121 may be communicatively coupled to the radio 123a. The RF communication device 104 may be operated in a system, such as the cellular network and/or digital video broadcast network, for example.

The radio 123a may comprise suitable logic, circuitry, and/or code that may be operable to implement various aspects of the invention. The radio 123a may comprise a transmitter 128, a receiver 126, and a signal strength indicator module 124. The radio 123a may be enabled to generate signals, such as local oscillator signals, for the transmission, reception, and processing of RF signals. The receiver 126 may be operable to down-convert, demodulate, and/or otherwise process received signals. The transmitter 128 may be operable to modulate, up-convert, and/or otherwise process signals for transmission. The signal strength indicator module 124 which may be operable to generate transmitted signal strength measurements and received signal strength measurements. In this regard, the signal strength indicator module 124 may be shared between transmit and receive operations.

The digital baseband processor 129 may comprise suitable logic, circuitry, and/or code that may enable processing and/or handling of baseband frequency signals. In this regard, the digital baseband processor 129 may process or handle signals received from and/or transmitted to the radio 123a. The digital baseband processor 129 may also provide control and/or feedback information to the radio 123a. The digital baseband processor 129 may communicate information and/or data from the processed signals to the processor 125 and/or to the memory 127. Moreover, the digital baseband processor 129 may receive information from the processor 125 and/or from the memory 127 for transmission.

The processor 125 may comprise suitable logic, circuitry, and/or code that may enable control and/or data processing operations for the RF communication device 104. The processor 125 may be utilized to control at least a portion of the radio 123a, the digital baseband processor 129, and/or the memory 127. In this regard, the processor 125 may generate at least one signal for controlling operations within the RF communication device 104. The processor 125 may also enable executing of applications that may be utilized by the RF communication device 104. For example, the processor 125 may execute applications that may enable displaying and/or interacting with content received via RF signals in the RF communication device 104.

The memory 127 may comprise suitable logic, circuitry, and/or code that may enable storage of data and/or other information utilized by the RF communication device 104. For example, the memory 127 may be utilized for storing processed data generated by the digital baseband processor 129 and/or the processor 125. The memory 127 may also be utilized to store information, such as configuration information, that may be utilized to control the operation of at least one block in the RF communication device 104. For example, the memory 127 may comprise information necessary to configure the radio 123a to enable receiving signals in the appropriate frequency band.

Figure 2A:
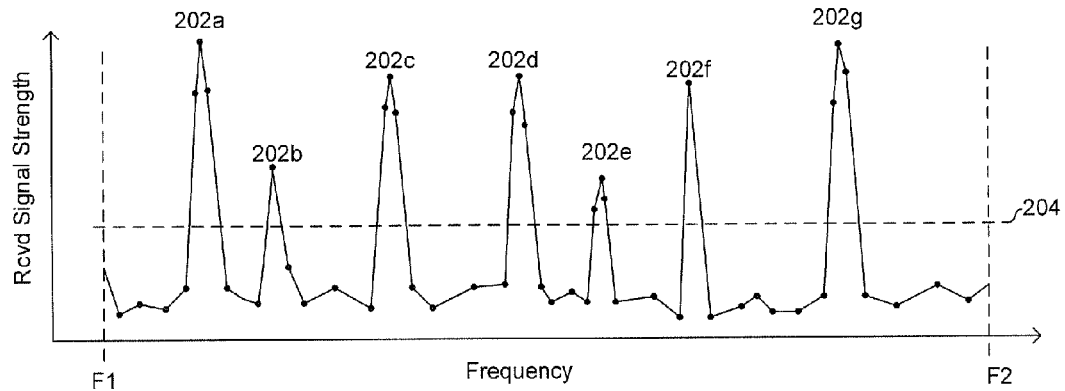
FIGS. 2A-2D illustrate determining a noise floor, in accordance with an embodiment of the invention.

FIGS. 2A-2D illustrate determining a noise floor, in accordance with an embodiment of the invention. Referring to FIG. 2A there is shown a graph of received signal strength vs. frequency, where each dot of the graph corresponds to signal strength of a sample of the received signal and the solid line connecting the dots is an interpolation of the dots for illustration purposes. In this regard, the communication device 104 may sweep the frequency band from F1 to F2, and store the signal strength measurements to memory. The channels 202a-202g shown in FIGS. 2A and 2B correspond to desired signals. For example, each of the channels 202a-202g may correspond to an FM broadcast radio station.

Figure 2B:
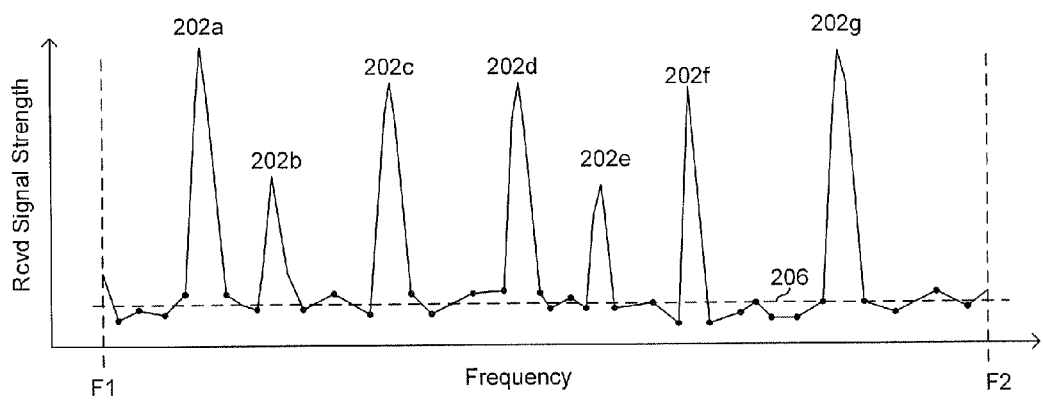

After sweeping the frequency band from F1 to F2, the communication device 104 may utilize the collected samples to determine the noise floor. In an exemplary embodiment of the invention, the communication device 104 may be operable to filter out samples having a signal strength above a threshold 204, as is shown in FIG. 2B, and then calculate an average of the samples below the threshold 204. In an exemplary embodiment of the invention, multiple thresholds and/or other factors may be utilized to determine which samples to utilize for the noise floor calculation.

In an exemplary embodiment of the invention, samples corresponding to local minima may be utilized for noise floor calculation. For example, the circled samples in FIG. 2D may correspond to local minima where local minima are determined to be samples that have lower signal strength than samples to which they are adjacent. For example, sample 222 is a local minimum because it has lower signal strength than samples 220 and 224.

In an exemplary embodiment of the invention, various weighting factors may be applied to one or more of the samples when calculating the average. In FIG. 2B, the average of the samples lying below the threshold 204, i.e., the determined noise floor, is shown as dashed line 206.

Figure 2C:
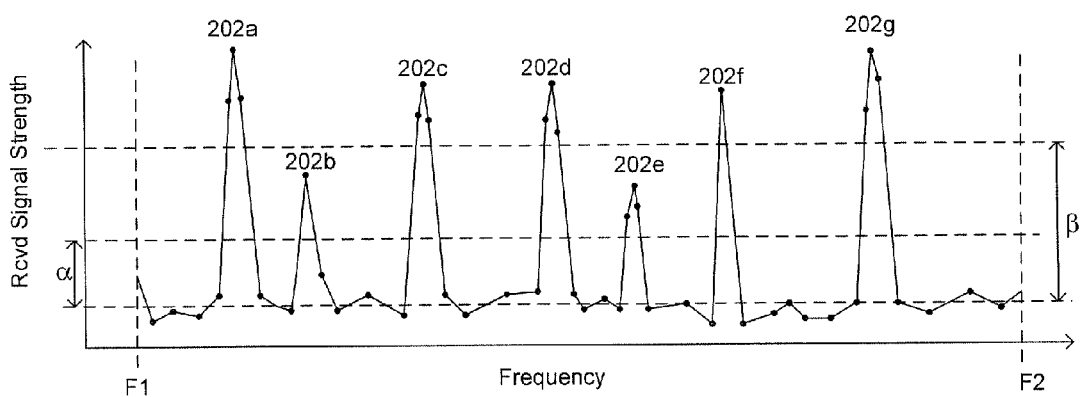
Figure 2D:
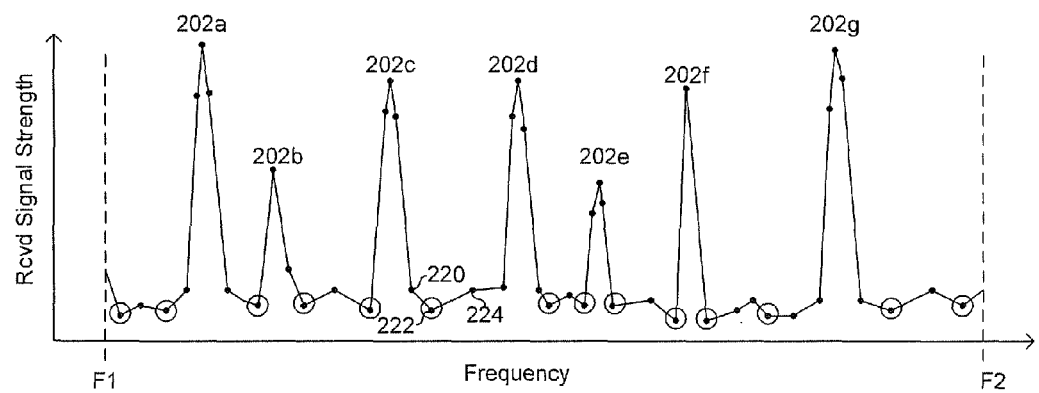

Referring to FIG. 2C, after determining the noise floor, the communication device 104 may classify the various channels 202a-202g based on the SNR of each of the channels. The SNR may be calculated by, for example, subtracting the determined noise floor from the RSSI measurements. The various channels may then be classified based on the calculated SNR values. For example, in an FM broadcast radio application, the channels 202a-202g may be classified based on whether they are suitable for RDS reception, stereo reception, monaural reception, or whether the channels are too noisy for suitable reception. Classification in a broadcast radio application is just one example and other classifications based on SNR may be performed. In order to classify the channels, the signal strength may be compared to one or more thresholds, where the thresholds may be established relative to the determined noise floor 206, rather than at absolute values. For example, channels having signal strength less than α above the noise floor may be too noisy for suitable reception, channels having signal strength greater than α above the noise floor but less than β above the noise floor may be suitable for monaural reception but unsuitable for stereo reception, and channels having a signal strength greater than β above the noise floor may be suitable for monaural, stereo reception, and RDS reception.

Figure 3A:
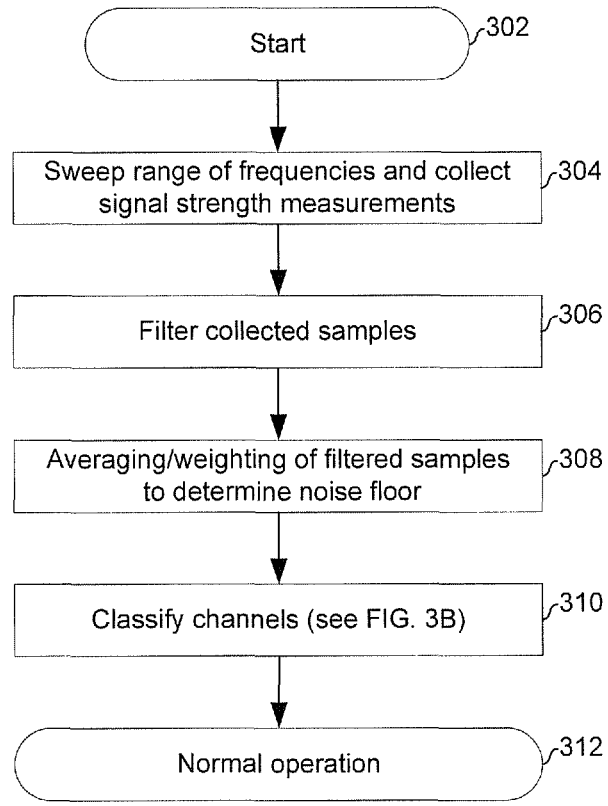
FIGS. 3A and 3B depict a flow chart illustrating exemplary steps for determining a noise floor and signal-to-noise ratio (SNR), in accordance with an embodiment of the invention.
Figure 3B:
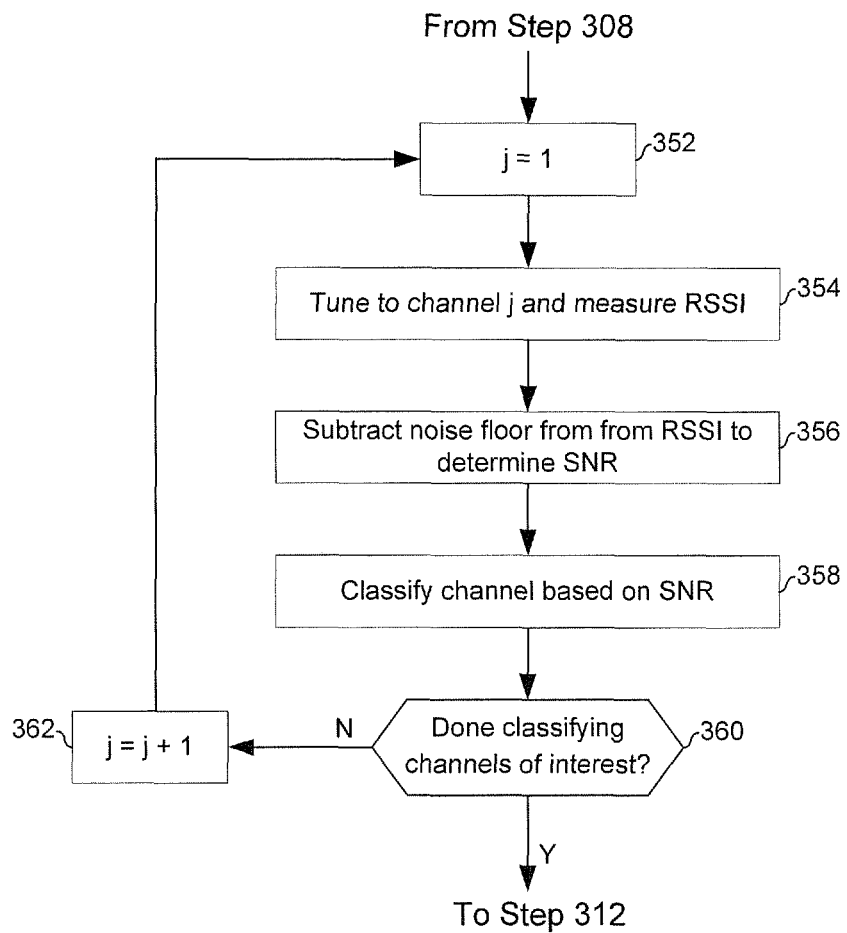

FIGS. 3A and 3B depict a flow chart illustrating exemplary steps for determining a noise floor and signal-to-noise ratio (SNR), in accordance with an embodiment of the invention. Referring to FIG. 3, subsequent to start step 302, the exemplary steps may proceed to step 304. In step 304, the communication device may sample a received signal over a frequency band from F1 to F2 and determine a signal strength corresponding to each sample. Subsequent to step 304, the exemplary steps may proceed to step 306. In step 306, the communication device 104 may filter the samples based on the determined signal strength corresponding to the samples. In this regard, samples corresponding to local minima, that is, samples having less signal strength then one or more surrounding samples may be selected for the purposes of determining the noise floor of the frequency band from F1 to F2. Subsequent to start step 306, the exemplary steps may proceed to step 308.

In step 308, samples not filtered out in step 306 may be averaged to determine the noise floor of the frequency band from F1 to F2. In one embodiment of the invention, one or more of the samples may be weighed differently than one or more other samples. For example, one or more of the samples may weigh more heavily than others in the noise floor determination based on the frequency band F1 to F2 being characterized, on the type of protocols supported by the communication device, and/or on past noise floor determinations made by the communication device 104. Subsequent to step 308, the exemplary steps may advance to step 310.

In step 310, the communication device 104 may classify the channels to which it may tune to receive desired signals. Additional details of step 310 are described below with respect to FIG. 3B. Subsequent to step 310, the exemplary steps may advance to step 312.

In step 312, the communication device 104 may enter a normal mode of operation in which the communication device 104 may tune and receive signals on one or more channels based on the classification.

Referring to FIG. 3B, in step 352, which may follow step 308 of FIG. 3A, a counter, j, may be set to 1. In this regard, j may correspond to an index of channels to be classified on the frequency band from F1 to F2. For example, if there are 10 channels within the frequency band from F1 to F2, then j=1 may correspond to the channel having the frequency closest to F1 and j=10 may correspond to the channel having a frequency closest to F2.

In step 354, the communication device may tune to channel j and measure the received signal strength on channel j. Subsequent to step 354, the exemplary steps may advance to step 356.

In step 356, the SNR of channel j may be calculated by subtracting the noise floor determined in step 308 from the signal strength of channel j measured in step 354. Subsequent to step 356, the exemplary steps may advance to step 358.

In step 358, the communication device may classify channel j based on the SNR of channel j. For example, FM broadcast radio stations may be classified as suitable for stereo reception, suitable for monaural reception, or unsuitable for reception. Subsequent to step 358, the exemplary steps may advance to step 360.

In step 360, it may be determined whether the channels that the communication device 104 desires to classify have been classified. In instances that the all channels for which a classification is desired have been classified, the exemplary steps may proceed to step 312. In instances that the channels for which a classification is desired have not been classified, the exemplary steps may proceed to step 362 in which j may be incremented before the steps return to step 352.

Figure 4:
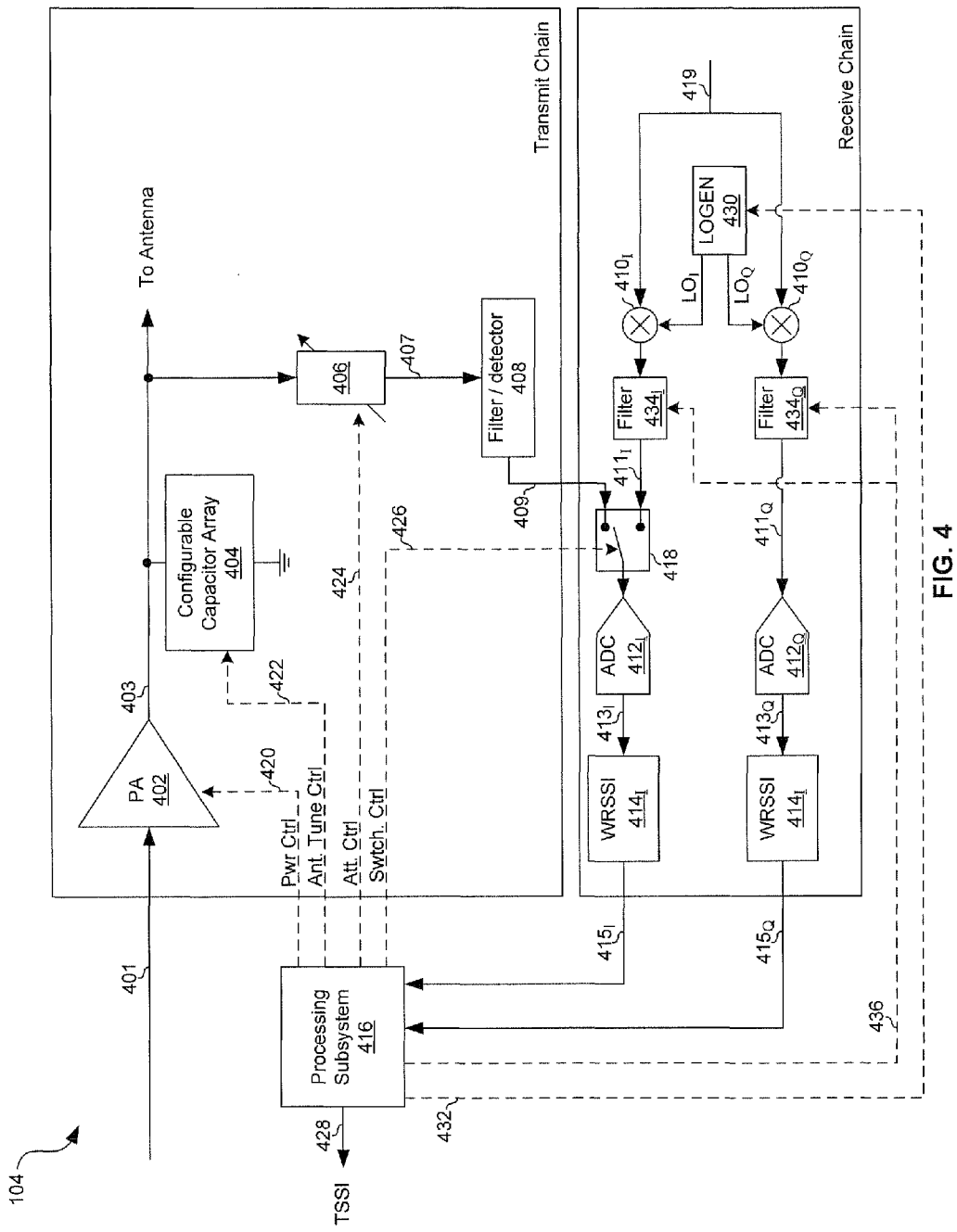
FIG. 4 is a diagram illustrating an exemplary communication device operable to utilize a single signal strength indicator (SSI) for transmit and receive operations, in accordance with an embodiment of the invention.

FIG. 4 is a diagram illustrating an exemplary communication device operable to utilize a single signal strength indicator (SSI) for transmit and receive operations, in accordance with an embodiment of the invention. Referring to FIG. 4, there is shown a portion of the communication device 104 comprising a power amplifier (PA) 402, a configurable capacitor array 404, a variable attenuator 406, a filter and/or detector 408, mixers $410_I$ and $410_Q$, analog-to-digital converters $412_I$ and $412_Q$, WRSSI modules $414_I$ and $414_Q$, processing subsystem 416, switching element 418, local oscillator generator (LOGEN) 430, and filters $434_I$ and $434_Q$. In an exemplary embodiment of the invention, the depicted portion of the communication device 104, and possibly additional portions of the communication device 104, may be integrated on a single die manufactured on a common substrate.

The PA 402 may comprise suitable logic, circuitry, interfaces, and/or code that may be operable to apply a gain to a signal 401 to generate the signal 403. The gain may be variable and may be controlled via a control signal 420 from the processing subsystem 416.

The configurable capacitor array 404 may comprise a plurality of capacitive elements communicative coupled via one or more switching elements. In this regard, by configuring the switching elements, the capacitance between the output of the PA 402 and signal ground may be varied. In an exemplary embodiment of the invention, the configurable capacitor array 404 may be a binary-weighted capacitance. Although not shown, the communication device 104 may comprise one or more additional configurable capacitor arrays which may enable tuning a receive portion and/or a transmit portion of the device 104. For example, one or more configurable capacitances may be configured based on a frequency on which the device 104 is receiving and/or a frequency of a received signal.

The variable attenuator 406 may comprise suitable logic, circuitry, interfaces, and/or code that may operable reduce a voltage of the signal 403 output by the PA 402. In this regard, the voltage swing out of the PA 402 may be greater than the input range of the ADC $412_I$.

The filter and/or detector 408 may comprise suitable logic, circuitry, interfaces, and/or code that may be operable to low-pass filter, sample and hold, or otherwise process the signal 407 to generate a signal 409 that may be accurately sampled and converted to a digital representation by the ADC $412_I$.

The mixers $410_I$ and $410_Q$ may comprise suitable logic, circuitry, interfaces, and/or code that may be operable to down-convert received signal 419 to quadrature phase baseband signals $411_I$ and $411_Q$.

The analog-to-digital converters (ADCs) $412_I$ and $412_Q$ may comprise suitable logic, circuitry, interfaces, and/or code that may be operable to generate a digital representation of an analog signal.

The switching element 418 may comprise, for example, a CMOS or MEMs switch. The position of the switch may be controlled based on the voltage of the signal 426, for example.

The WRSSI module $414_I$ and $414_Q$ may each comprise suitable logic, circuitry, and/or code that may enable determining signal levels. In this regard, the WRSSI module $414_I$ and $414_Q$ may, for example, be enabled to measure current, voltage and/or power of the signals $413_I$ and $413_Q$, respectively. Additionally, the WRSSI module $414_I$ and $414_Q$ may each be operable to convey measurement results to the processing subsystem 416 in the form of signals $415_I$ and $415_Q$. The WRSSI module $414_I$ and $414_Q$ may be "wideband" in that they may be operable to determine the strength of signals over a larger bandwidth than a RSSI that is operable to measure received signal strength on only one channel.

The processing subsystem 416 may comprise suitable logic, circuitry, interfaces, and/or code that may be operable to control and configure operation of the communication device 104. The processing subsystem 416 may comprise, for example, a processor and memory. A processor of the processing subsystem 416 may comprise, for example, a general purpose processors such as an ARM or x86 based processor or or may comprise an application specific integrated circuit (ASIC). Memory of the processing subsystem 416 may comprise, for example, RAM, ROM, flash, or magnetic storage. The processing subsystem 416 may control the gain of the PA 402 via the signal 420, configure the capacitor array 404 via the signal 422, control the attenuator 406 via the signal 424, configure the switching element 418 via the signal 426, configure the phase and/or frequency output by the LOGEN 430 via the signal 432, and configure the frequency response of the filters $434_I$ and $434_Q$ via the signal 436.

The LOGEN 430 may comprise suitable logic, circuitry, interfaces, and/or code that may be operable to generate a pair of quadrature phase local oscillator (LO) signals. The frequency and/or phase of the generated LO signals may be determined by the control signal 436. The LOGEN 430 may comprise, for example, a phase locked loop (PLL) and/or direct digital frequency synthesizer (DDFS).

The filters $434_I$ and $434_Q$ may comprise suitable logic, circuitry, interfaces, and/or code that may be operable to filter out undesired signals from the output of the mixers 410I and 410Q, respectively. The frequency response of the filters $434_I$ and $434_Q$ may be configurable via the signal 436.

In operation, in order to determine a noise floor of the frequency band from F1 to F2, the processing subsystem 416 may configure the LOGEN 430 and filters $434_I$ and $434_Q$ into a series of configurations, with each configuration corresponding to a frequency in the band from F1 to F2 for which a signal strength measurement is desired. The switching element 418 may be configured to couple the filter $434_I$ output to the ADC $412_I$ and, for each configuration, a signal strength measurement may be generated and stored in the processing subsystem 416.

For calibrating the transmit chain, the switching element 418 may be configured to couple the signal 409 to the ADC $412_I$ and the processing subsystem 416 may control the gain of the PA 402, the configuration of the capacitor array 404, and the attenuation of the attenuator 406 based on the measured transmit signal strength and/or based on a frequency of the signal to be transmitted. Additional details of calibrating the transmit chain are described below with respect to FIG. 5.

Figure 5:
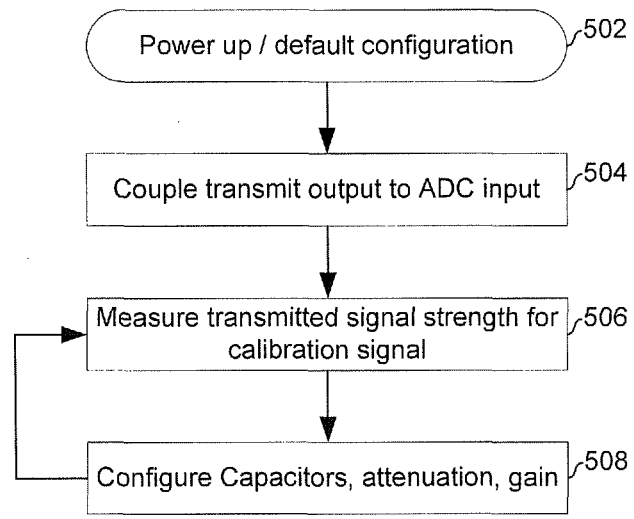
FIG. 5 is a flow chart illustrating exemplary steps for calibrating a transmit chain, in accordance with an embodiment of the invention.

FIG. 5 is a flow chart illustrating exemplary steps for calibrating a transmit chain, in accordance with an embodiment of the invention. Referring to FIG. 5 the exemplary steps may begin with step 502 in which the communication device 104 may power up in a default configuration. In this regard, the default configuration may comprise default settings for the PA 402, the capacitor array 404, and the attenuator 406. Subsequent to step 502, the exemplary steps may proceed to step 504. In step 504, the switch 418 may be configured to couple the signal 409 to the ADC $412_I$. Subsequent to step 504, the exemplary steps may advance to step 506.

In step 506, a signal 401 may be input to the PA 402 and the capacitor array may be configured based on the frequency of the signal 401. In this regard, the capacitor array 404 may be configured via a look-up table that stores capacitor configuration vs. frequency data. The WRSSI module $414_I$ may generate a signal strength indication for the resulting signal, and the signal strength indication may be conveyed to the processing subsystem 416. Subsequent to step 506, the exemplary steps may advance to step 508.

In step 508, the gain of the PA 402, the attenuation of the attenuator 406, and/or the capacitance of the capacitor array 404 may be adjusted based on the signal strength indication generated in step 506. Subsequent to step 508, the exemplary steps may return to step 506. In this regard, the PA 402, capacitor array 404, and/or attenuator 406 may be updated occasionally, periodically, and/or continuously to account for changes in, for example, the signal 401, changes in voltage(s), and/or changes in environmental conditions.

In an exemplary embodiment of the invention, a calibration signal may be input as the signal 401 to calibrate the PA 402, the capacitor array 404, and/or the attenuator 406. The calibration signal may comprise, for example, a sine wave having a frequency selected based on, for example, a frequency at which the communication device 104 expects to transmit during normal operation. The calibration signal may be generated by the LOGEN 430 or a similar circuit.

Although various aspects of the invention have been described with regard to wireless signals, aspects of the invention may also be utilized for wired communications.

Various aspects of a method and system for signal strength measurement are provided. In an exemplary embodiment of the invention, in a radio comprising a transmitter and a receiver, transmission and reception of signals may be controlled based on received signal strength measurements from a signal strength indicator module $414_I$ and transmitted signal strength measurements from the signal strength indicator module $414_I$. For the transmitted signal strength measurements, the shared signal strength indicator module $414_I$ may measure signal strength of a signal 409 output by a power amplifier. For the received signal strength measurements, the shared signal strength indicator module $414_I$ may measure signal strength of a received signal $411_I$. A capacitance 404 coupled to an output of the PA 402 may be configured based on a frequency of the signal 403 output by the PA 402. A gain of the PA 402 may be controlled based on the transmitted signal strength measurements. For the transmitted signal strength measurements, an analog-to-digital converter $412_I$ may process the signal 409 output by the PA 402. For the received signal strength measurements, the analog-to-digital converter $412_I$ may process the received signal $411_I$. An output of the analog-to-digital converter $412_I$ may be input to the signal strength indicator module $414_I$.

In one aspect of the invention, a plurality of samples may be generated by sampling the received signal $411_I$ over a range of frequencies, the signal strength indicator module $414_I$ may measure signal strength of each of the samples, and a noise floor may be calculated based on samples, such as the sample 222, that correspond to local minima. The noise floor may be calculated utilizing a weighted averaging of the local minima. A signal-to-noise ratio of one or more channels 202 in the range of frequencies from F1 to F2 may be calculated by subtracting the calculated noise floor from one or more signal strength measurements corresponding to one or more samples lying within the one or more channels 202. Channels 202 within the range of frequencies from F1 to F2 may be classified based on the calculated signal-to-noise ratio. The one or more channels 202 may be FM broadcast radio channels, and each of the FM broadcast radio channels may be classified into one of the following exemplary categories: channels that are too noisy for suitable reception, channels that are suitable for monaural reception, and channels that are suitable for stereo reception.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for signal strength measurement.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communications, the method comprising:
   in a radio comprising a transmitter and a receiver:
   controlling transmission and reception of signals for said radio based on received signal strength measurements from a signal strength indicator module and transmitted signal strength measurements from said signal strength indicator module, wherein:
   for said transmitted signal strength measurements, said signal strength indicator module measures signal strength of a signal output by a power amplifier in said transmitter; and
   for said received signal strength measurements, said signal strength indicator module measures signal strength of a received signal received by said receiver.

2. The method according to claim 1, comprising:
   generating, over a range of frequencies, a plurality of samples of a signal received by said receiver;
   measuring, utilizing said signal strength indicator module, a signal strength of each one of said plurality of samples; and
   determining which samples of said plurality of samples correspond to local minima;
   calculating a noise floor utilizing said samples that correspond to local minima.

3. The method according to claim 2, comprising calculating said noise floor based on a weighted average of said local minima.

4. The method according to claim 2, comprising calculating a signal-to-noise ratio of one or more channels in said range of frequencies by subtracting said calculated noise floor from one or more signal strength measurements corresponding to one or more of said plurality of samples lying within said one or more channels.

5. The method according to claim 4, comprising classifying said one or more channels in said range of frequencies based on said calculated signal-to-noise ratio.

6. The method according to claim 5, wherein:
   said one or more channels are FM broadcast radio channels; and
   each of said FM broadcast radio channels is classified into one of the following categories:
   channels that are too noisy for suitable reception;
   channels that are suitable for monaural reception;

channels that are suitable for stereo reception; and
channels that are suitable for Radio Data System reception.

7. The method according to claim 1, comprising configuring a capacitance coupled to an output of said power amplifier based on a frequency of said signal output by said power amplifier.

8. The method according to claim 1, comprising controlling a gain of said power amplifier based on said transmitted signal strength measurements.

9. The method according to claim 1, comprising utilizing a single analog-to-digital converter of said communication device for generating said transmitted signal strength measurements and said received signal strength measurements, wherein:
for said transmission, said analog-to-digital converter processes said signal output by said power amplifier; and
for said reception, said analog-to-digital converter processes said received signal.

10. The method according to claim 9, wherein an output of said analog-to-digital converter is an input to said signal strength indicator.

11. A system for communications, the system comprising:
one or more circuits in a radio, wherein said one or more circuits comprise a transmitter, a receiver, a signal strength indicator module, and a power amplifier, and said one or more circuits are operable to:
control transmission and reception of signals for said radio based on received signal strength measurements from said signal strength indicator module and transmitted signal strength measurements from said signal strength indicator module, wherein:
for said transmitted signal strength measurements, said signal strength indicator module measures signal strength of a signal output by said power amplifier in said transmitter; and
for said received signal strength measurements, said signal strength indicator module measures signal strength of a received signal received by said receiver.

12. The system according to claim 11, wherein said one or more circuits are operable to:
generate, over a range of frequencies, a plurality of samples of a signal received by said receiver;
measure, utilizing said signal strength indicator module, a signal strength of each one of said plurality of samples; and
determine which samples of said plurality of samples correspond to local minima;
calculate a noise floor utilizing said samples that correspond to local minima.

13. The system according to claim 12, wherein said one or more circuits are operable to calculate said noise floor based on a weighted average of said local minima.

14. The system according to claim 12, wherein said one or more circuits are operable to calculate a signal-to-noise ratio of one or more channels in said range of frequencies by subtracting said calculated noise floor from one or more signal strength measurements corresponding to one or more of said plurality of samples lying within said one or more channels.

15. The system according to claim 14, wherein said one or more circuits are operable to classify said one or more channels in said range of frequencies based on said calculated signal-to-noise ratio.

16. The system according to claim 15, wherein:
said one or more channels are FM broadcast radio channels; and
each of said FM broadcast radio channels is classified into one of the following categories:
channels that are too noisy for suitable reception;
channels that are suitable for monaural reception;
channels that are suitable for stereo reception; and
channels that are suitable for Radio Data System reception.

17. The system according to claim 11, wherein said one or more circuits are operable to configure a capacitance coupled to an output of said power amplifier based on a frequency of said signal output by said power amplifier.

18. The system according to claim 11, wherein said one or more circuits are operable to control a gain of said power amplifier based on said transmitted signal strength measurement.

19. The system according to claim 11, comprising utilizing a single analog-to-digital converter of said communication device for generating said transmitted signal strength measurements and said received signal strength measurements, wherein:
for said transmission, said analog-to-digital converter processes said signal output by said power amplifier; and
for said reception, said analog-to-digital converter processes said received signal.

20. The system according to claim 19, wherein an output of said analog-to-digital converter is an input to said signal strength indicator.

21. A method for communications, the method comprising:
performing in a radio comprising a receiver:
generating, over a range of frequencies, a plurality of samples of a signal received by a receiver;
measuring, utilizing a signal strength indicator module, a signal strength of each one of said plurality of samples; and
determining which samples of said plurality of samples correspond to local minima;
calculating a noise floor utilizing said samples that correspond to local minima.

22. The method according to claim 21, comprising calculating said noise floor based on a weighted average of said local minima.

23. The method according to claim 21, comprising calculating a signal-to-noise ratio of one or more channels in said range of frequencies by subtracting said calculated noise floor from one or more signal strength measurements corresponding to one or more of said plurality of samples lying within said one or more channels.

24. The method according to claim 21, wherein said one or more circuits are operable to classify said one or more channels in said range of frequencies based on said calculated signal-to-noise ratio.

25. The system according to claim 24, wherein:
said one or more channels are FM broadcast radio channels; and
each of said FM broadcast radio channels is classified into one of the following categories:
channels that are too noisy for suitable reception;
channels that are suitable for monaural reception;
channels that are suitable for stereo reception; and
channels that are suitable for Radio Data System reception.

* * * * *